United States Patent [19]

Serpelloni et al.

[11] Patent Number: 5,478,593
[45] Date of Patent: Dec. 26, 1995

[54] PROCESS OF SUGARLESS HARD COATING AND PRODUCTS OBTAINED THEREFROM

[75] Inventors: Michel Serpelloni, Beuvry les Bethune; Guillaume Ribadeau-Dumas, Lambersart, both of France

[73] Assignee: Roquette Freres, Lestrem, France

[21] Appl. No.: 241,709

[22] Filed: May 12, 1994

[30] Foreign Application Priority Data

May 17, 1993 [FR] France ................................. 93 05917

[51] Int. Cl.$^6$ ................ A23G 3/30; A23B 9/14; B05D 1/36
[52] U.S. Cl. .................. 427/2.14; 427/202; 426/303; 426/304; 426/291; 426/660
[58] Field of Search ................... 427/2.18, 2.23, 427/346, 2.14, 202; 426/5, 303, 304, 660, 291; 424/440

[56] References Cited

U.S. PATENT DOCUMENTS

| | | | |
|---|---|---|---|
| 3,524,756 | 8/1970 | Signorino et al. | 427/2.2 |
| 4,127,677 | 11/1978 | Fronczkowski et al. | 426/5 |
| 4,176,175 | 11/1979 | Maekawa et al. | 427/2.18 |
| 4,238,510 | 12/1980 | Cherukuri et al. | 426/5 |
| 4,382,962 | 5/1983 | Devos et al. | 426/3 |
| 4,408,041 | 10/1983 | Hirao et al. | 536/4.1 |
| 4,423,086 | 12/1983 | Devos et al. | 427/2.18 |
| 4,684,523 | 8/1987 | Ferrero | 427/2.18 |
| 4,725,446 | 2/1988 | Forster et al. | 427/2.18 |
| 4,753,790 | 6/1988 | Silva et al. | 427/2.18 |
| 4,840,797 | 6/1989 | Boursier . | |
| 4,979,463 | 12/1990 | Sollich | 118/57 |
| 5,098,715 | 3/1992 | McCabe et al. | 427/2.18 |
| 5,135,761 | 8/1992 | Dave et al. | 426/5 |
| 5,360,621 | 11/1994 | Mentink et al. | 426/548 |
| 5,376,389 | 12/1994 | Reed et al. | 426/5 |

FOREIGN PATENT DOCUMENTS

| | | |
|---|---|---|
| 0228999 | 12/1986 | European Pat. Off. . |
| 0273000 | 4/1987 | European Pat. Off. . |
| 1137104 | 11/1955 | France . |
| 2464656 | 6/1980 | France . |
| WO88/08671 | 4/1988 | WIPO . |
| WO91/09989 | 12/1990 | WIPO . |

OTHER PUBLICATIONS

Derwent Abstract 48207 of JP 57107159, Jul., 1982.

*Primary Examiner*—Diana Dudash
*Attorney, Agent, or Firm*—Larson & Taylor

[57] ABSTRACT

The object of the present invention is an improved hard coating process using a polyol in powder form, enabling easy, speedy creation of a hard coating on the surface of a product. This process consists essentially of the application of a syrup containing at least 90% of a polyol chosen from sorbitol, maltitol, mannitol, xylitol, erythritol, lactitol and isomalt to a product, followed by, the application, in powder form, of a quantity of powder which has a purity higher than 95% with respect to this same polyol; these applications being performed without carrying out a forced drying.

9 Claims, No Drawings

PROCESS OF SUGARLESS HARD COATING AND PRODUCTS OBTAINED THEREFROM

The object of the present invention is an improved hard coating process using a polyol in powder form, enabling easy, speedy creation of a hard coating on the surface of a product.

It also concerns hard coatings and the coated products obtained by application of the process.

The polyols concerned by the present invention are sugar alcohols chosen from amongst those comprising sorbitol, maltitol, mannitol, xylitol, erythritol, lactitol and isomalt. These products are obtained by industrial methods, respectively by hydrogenation of D-glucose, maltose, fructose or levulose, xylose, erythrose, lactose and isomaltulose.

Polyols, with a sweet taste generally less than that attributed to sucrose, which they are increasingly replacing in human nutrition as well as in pharmaceutical and dietetic formulations, have the added advantage of not being cariogenic. They have a calorific value estimated as approximately one-third lower than that of sugar.

These polyols are all commercialized in powder form, of varying degrees of purity. For the particular case of isomalt, which corresponds to an equimolecular mixture of alpha D-glucopyranosyl-1-6-sorbitol and alpha D-glucopyranosyl 1-6-mannitol, the notion of purity, although without chemical meaning, will be extended for the purpose of this invention. It will correspond to the stun of the quantities of isomeric molecules given above, related to the dry matter of the powder considered. Isomalt powders are thus commercially available with a purity higher than 95% in the sense used by this invention.

Among the aforementioned polyols, only sorbitol is today commercialized in the form of highly pure syrups. This is because this polyol is highly soluble compared to the other polyols mentioned. Sorbitol syrups of this very great purity are for example sold by the Applicant under the trade name of NEOSORB® 70/05 and NEOSORB® 70/02. The process as described below may be applied equally to any one of the polyols mentioned above.

Hard coating is a unit operation used in many fields, among which are confectionery and pharmaceutical fields. It may also concern the industry of additives such as flavourings, sweeteners, vitamins, enzymes, acids and plant-based products. The operation consists in creating a hard coating on the surface of products in solid or powder form, in order to protect them for various reasons, or in order to give them an attractive appearance or pleasant taste.

The object of hard coating is to obtain a sweet, crunchy layer which is always much appreciated in confectionery or chewing gums.

It always requires a syrup containing crystallizable matter. The hard, crystalline coating is therefore obtained by applying the syrup and evaporating off the water it contains by blowing with warm, dry air. This cycle must be repeated a great many times, from ten to eighty times, in order to reach the swelling required.

The term "swelling" will refer to the increase in weight of the products, as considered at the end of operations by comparison with the beginning, and in relation to the final weight of the products.

Hard coating may be preceded by other coating techniques, more particularly the following techniques:

gumming (or glazing), which is a technique in which syrups made from non-crystallizable, generally non-hygroscopic matter such as gum arabic, modified starches and celluloses, and maltodextrins are used. This technique enables a vitreous film, serving as a barrier against the migration of oxygen, water or fats, to be created in one or two applications of syrup to the product to be coated. In this process, use may also be made of powders of various natures in conjunction with these non-crystallizable syrups, so as to fix the water the latter contain. In yet other cases, sugars or polyols which have been melted or liquefied by solvents may be used. The hard, brittle, vitreous layer is then obtained by cooling or by evaporation of the solvents.

soft coating consists in building up a very chewy, soft layer on the surface of the products. This coating is obtained by repeated applications, first of a non-crystallizable syrup, generally such as starch hydrolysates, and then of a powder, usually crystallized sucrose. The coating is usually thick. The swelling in this technique is around 10–80%, sometimes even more. It should be noted that the matter used for the syrup is usually different from that constituting the powder.

The term hard coating as used in the present invention will also comprise smoothing and frosting, which are very similar techniques.

Smoothing consists in one or two applications or loads of a crystallizable syrup which is not as concentrated as that used in hard coating. The object is often to finish the surface appearance of coated products.

As for frosting, while this is also used to improve the products' appearance, it also aims to isolate them from ambient humidity. This technique resembles hard coating, in that a crystallizable syrup is used. The essential difference is that only one, two or three cycles are carried out.

Of more particular interest in the context of the present invention are the hard coating as such, smoothing, frosting, and any combination of the three techniques. Hard coating will often be followed by smoothing.

Several of these coating processes have been applied using polyols such as sorbitol, mannitol, xylitol, hydrogenated starch hydrolysates, maltitol, lactitol, erythritol and hydrogenated isomaltulose. They are abundantly described in the literature. They may be divided into two main categories.

The first group of processes is commonly used in industry, particularly for sorbitol and xylitol. These processes resemble hard coating and consist in applying a syrup or crystallizable suspension to the surface of the products requiring a coating, generally confectionery. The word "crystallizable" should be understood to mean that the polyol syrup or suspension applied to the surface of the products is sufficiently rich in any one of the polyols mentioned above to turn into a coating of crystalline nature once its water has been evaporated off by air in the coating pans. Such processes have been described many times, for example in patent EP 37 407, of which the Applicant is the owner, and which concerns sorbitol. Patents EP 201 412, also owned by the Applicant, and EP 273 000 and U.S. Pat. No. 4,792,453, respectively concerning the use of maltitol, xylitol and isomalt for hard coating, may also be mentioned.

These processes are characterized by the fact that they comprise a great many cycles, as in the traditional process with sugar. Each of these repetitive cycles always comprises an initial stage in which the polyol syrup is sprayed into the tumbling bed of the products to be coated, a second stage enabling this syrup to be spread homogeneously over the surface of the products, and finally a third stage in which the water contained in the syrup is evaporated off by a dry hot air flow, thus ensuring crystallization of the polyol applied.

It is therefore easy to understand that the main defect of these processes is their extreme slowness. This may be explained by the fact that it is obligatory to spray very small quantities of syrup a large number of times and at intervals, in order to avoid agglomeration of products which must remain separate. These quantities of syrup are about 10–30 gram per kilogram of product to be coated, which corresponds to an added amount of 6 to 20 grammes of polyol per kilogramme of product. Thus, to increase the weight of an article by some 20%, several hours, indeed sometimes several days, are necessary.

This considerable disadvantage may, of course, be remedied either by increasing the capacity of the coating pans, or by automating the existing equipment so as to reduce each of the spraying, spreading and drying sequences to a minimum, or again by increasing the number of pans used in the industrial process. It may easily be understood that these are simply piecemeal remedies since they do not eliminate the problem at source, and inevitably result in considerable extra cost.

Another serious drawback of these processes is that they require a period of drying by hot, dry air flow for each of the cycles, as indicated earlier. This uses up not only energy but above all, time. Indeed, this stage takes around half of the time needed to carry out a single cycle. It is difficult, indeed impossible, to reduce this drying stage, since it is essential to dry the products between each successive layer obtained, in order to produce hard, crystalline coatings.

There is a second category of polyol coating processes, which combine the use of a syrup with that of a powder. It should be noted that the polyol predominantly used for the syrup may or may not be different in nature from the polyol present as a majority in the powder.

This category of processes, which largely resembles those of soft coating, is also very different from the invention disclosed in detail hereinbelow. Such processes are very well described in the literature.

The following disclosed processes are of interest:

that in U.S. Pat. No. 4 238 510 which concerns a coating containing between 45 and 90% sorbitol; the confectionery products are coated by means of hot dry air flow in the pans and by application of a polyol syrup and a mixture of sorbitol and mannitol powders. This process is always very long since it requires several days. Moreover, it only enables soft surface coatings to be obtained, never hard and crunchy ones as desired by consumers in general.

that in patent application WO 91/09989, which concerns a coating with sorbitol. The sole object of the process described, which resembles a soft coating process, is in fact to obtain highly crystalline, hard and brittle hard coating layers like those of patent EP 37 407 owned by the Applicant and referred to above. The need to dry the product at each of the many coating cycles means that the process, while capable of gaining considerable time, is nevertheless not yet entirely satisfactory.

Having made these observations, the Applicant discovered that research was still continuing to find a hard coating process making profitable use of polyols as a replacement for sugar, which did not have the disadvantages of those described above, or in other words, would have the following advantages:

it would be very fast and allow considerable gains of time and therefore of capacity.

it would be simple to set up for industrial use, it would produce very high quality, non-sticky, coated products, the appearance or texture of which do not alter significantly over time.

The Applicant company, who wished to improve the state of the art, and make the known processes of hard crystalline coating more energy- and time-saving, without diminishing the quality of the final products, surprisingly and unexpectedly discovered that, extremely hard and brittle coatings, which crunch when bitten, can be obtained simply by waiting a few hours before packaging, and without having recourse to a drying stage by circulation of air at every cycle of the coating process. This is contrary to what the man skilled in the art normally does and to what would have been logical given the recommendations to this end which are found in the prior art.

This result may be obtained by combining a polyol powder of very great purity with a crystallizable syrup containing a majority of the same polyol in relation to its soluble dry matter, during each cycle. Thus, the process in accordance with the invention is shortened in comparison with those in the prior art, since the many drying stages using a hot dry air flow, which are energy- and time-wasting, are no longer necessary. The gain is all the more considerable as the desired swelling is high. To obtain a result of satisfactory quality, in other words non-sticky coatings with good adherence to the coated products and also stability over time, the Applicant has observed that on the one hand a syrup containing over 90% of a polyol in relation to its soluble dry matter, and on the other hand a powder which has a purity higher than 95% with respect to this same polyol, should be used.

The present invention therefore concerns a hard coating process which enables a hard crunchy coating to be created on the surface of a product by means of a coating pan, and includes at least one cycle comprising:

a stage of application of a syrup composed of at least 90% by weight in relation to its soluble dry matter, of a polyol chosen from among sorbitol, maltitol, mannitol, xylitol, erythritol and isomalt, at least one stage of application in powder form, of a powder over 95% pure by weight of the same polyol; the said application stages being carried out in any order, then a stage during which the applied syrup and powder are spread evenly; the process being characterized in that this cycle does not comprise a stage of forced drying by air flow.

The powder applied has a purity preferably higher than 98%, and more preferably higher than 99%. Such products are available commercially. Known powders are for instance those sold under the trade names NEOSORB® for sorbitol, XYLISORB® for xylitol, PALATINIT® for isomalt, MALTISORB® for maltitol, PEARLITOL® for mannitol and LACTY® for lactitol.

As far as polyol syrups are concerned, in the case of sorbitol, the product marketed under the trade name NEOSORB® 70/05 may be used directly, and better still NEOSORB® 70/02. In all cases, the syrup applied may be prepared using the polyol powder applied, and which is suitable for the process in accordance with the invention.

In accordance with a general embodiment of the invention, the products to be coated will be subjected to panning, that is a rotating movement in a coating pan. This may have an ordinary shape, that is to say a tulip shape with an inclined rotating axis, or a cylindrical shape with a horizontal axis. The products, preferably always freed of dust before or after their introduction into the pan, will present a preferably spherical, cylindrical or oval shape in order to facilitate the coating operation, but they may also have a cushion or pastille shape.

The process in accordance with the invention enables very varied products to be coated. They may be food products, for instance confectionery such as chewing gums, tablets, lozenges, jellies, liqueur eggs, chewy pastes, hard sweets, chocolate products, but also pharmaceutical or veterinary products such as pills, tablets, products for animals, dietary food such as plant granules, seeds or grains, agglomerated fertilizer powders or again additives based on enzymes or microorganisms, designed more particularly for the manufacture of food products such as bread or of industrial products such as washing powders, powdered additives composed of vitamins, flavourings, perfumes, acids, sweeteners or various active ingredients.

In a general embodiment of the invention, the process consists of spraying the chosen polyol syrup evenly over the surface of the tumbling products. It should be noted that these products may be gummed prior to the operation in accordance with conventional techniques. Then a quantity of powder consisting of the same polyol of great purity is pulverized onto the product. After the powder has been spread, a further spraying and powdering cycle may be carried out. In this case, the second cycle will preferably be carried out a few minutes after the first cycle, in order to allow drying of the product surface. It is to be noted that the process in accordance with the invention requires at least one, but preferably two, applications, in powder form, of a polyol powder of great purity. These applications may be carried out during the same cycle or during different cycles, it being understood that a cycle is defined in the present invention as comprising a single application of the polyol syrup.

The process in accordance with the general embodiment of the invention is always distinctly shorter than those in the prior art. For example, very high swellings around 50% may be obtained in less than three hours. For lower percentages, around 20%, the maximum time needed will be less than half this, and generally around 1 hour, that is to say six times less than the processes in the prior art using only a crystallizable syrup.

As regards the polyol powder of high purity to be used, fine powders are preferred, having less than 10% of particles with a diameter over 250 microns and less than 10% of particles with a diameter under 40 microns. Ideally, the powder will have an average diameter between 80 and 100 microns.

The syrup will generally be at ambient temperature, but in order to obtain great homogeneity in the spreading of the syrup a higher temperature may be chosen, enabling the viscosity of the coating syrup to be lowered to less than 300 cps.

Under normal conditions, the dry matter of the syrup will represent between 40 and 85%, according to its temperature and the nature of the polyol chosen. Ideally, these syrups may comprise between 0.5 and 5% of gelatine, gum arabic or modified celluloses, and possibly from 0.5 to 2% of pigments such as calcium carbonate, titanium oxide or a food colouring.

However, a syrup containing over 90%, preferably over 92% and more preferably still, over 95% of a polyol, should always be used; these percentages are calculated in relation to the soluble dry matter. These syrups may be prepared with a powder having a purity higher than 90%.

The number of cycles needed to coat the products will be between 1 and 10 for a hard coating, between 1 and 3 for smoothing and between 1 and 5 for frosting. Each cycle will comprise spraying of 5 to 35 milliliters of a syrup which has a dry matter content between 50 to 85% in the case of frosting or hard coating, and spraying of 15 to 50 milliliters of a syrup which has a dry matter content between 40 to 60% in the case of smoothing. These quantities correspond to those required to coat one kilogramme of product during one cycle, and vary according to the nature of the product, particularly according to its porosity. The quantities of polyol powder distributed during one or several cycles will generally be between 5 and 70 grammes per kilogramme of product to be coated, the lower values being preferred for smoothing.

The spreading stage between two cycles will last preferably about 5 minutes for the initial applications. This time will be very gradually reduced to about 2 minutes in the final stage of coating.

The polyol content of final hard coatings will be as high as 95 to 99.5%, preferably 98 to 99.5% in the case of frosting or hard coating, and that this content will be simply over 80% in the case of smoothing.

As regards the quantity of polyol powder pulverized in the coating of products as destined for commercialization, this will generally be between 65 and 90% for frosting and hard coating, and between 40 and 80% for smoothing.

The process in accordance with the invention can, for a chosen item to be sugar-coated, proceed or follow another sugar-coating or coating operation known in the prior art. It is also possible to apply, for the same item, the process in accordance with the invention by choosing one polyol for a portion of the sugar coating and a second polyol for another portion.

To finish, conventional smoothing will enable the appearance of the products to be improved. The use of fats or waxes designed to waterproof the coating, while also improving its appearance, may also be envisaged.

The application of the invention as disclosed above enables products with a crunchy coating to be obtained after a few hours' storage before packaging. It is not necessary to undertake stoving but the products should preferably simply be stored for a few hours in a dry atmosphere.

The invention also discloses a new product which is a surface hard coating designed to protect or embellish a product, constituted of at least 5%, preferably at least 15% and more preferably still 20 to 99.5%, of polyol powder having a purity higher than 95%, preferably higher than 98%, more preferably still higher than 99%, this polyol being chosen from among maltitol, mannitol, xylitol, erythritol and isomalt. This hard coating has a very high crystallinity, greater than that which it is possible to obtain by carrying out a hard coating using only a syrup. For example, in the case of maltitol, the hard coating according to the invention has an enthalpy of fusion greater than 120 joules/gramme and generally close to 145 joules/gramme, as well as a peak of fusion greater than 145° C. By way of comparison, by carrying out the process according to the teachings of Patent EP 201 412 relating to maltitol, it is only possible, at best, to reach an enthalpy of 110 joules/gramme and to obtain a maximum peak of fusion of 140° C.

Generally, the crystallinity of the coating according to the invention is such that its enthalpy of fusion is at least equal to 70%, and preferably 80%, of that of the polyol of which it is made, taken in its most stable or most common commercial crystalline form. Thus, there will for example be chosen as polyol for comparison, sorbitol crysallised in gamma form and lactitol monohydrate.

The methods by which the process may be applied in accordance with the invention, as described hereinabove, are not intended to limit the scope of the invention and are simply relative to means of production which are advantageous and preferred. The flexibility and speed of execution of the process, and its many other advantages listed above, will probably better be understood in the light of the following examples.

EXAMPLE 1

Comparison of the process in accordance with the invention with those of the prior art 1. Products used Chewing gums, formulated with polyols, that is to say with a LYCASIN® 80/55 syrup and NEOSORB® P60 powdered sorbitol, having a cushion shape approximately 2 centimeters long and 1 centimeter wide, are coated by the process in accordance with the invention, in order to obtain hard, crunchy coatings.

By way of comparison, the same products are coated with sorbitol in accordance with the processes disclosed in patent EP 037 407 (example 4, test no. 16), patent application WO 91/09989 (example 1) and U.S. Pat. No. 4,238,510 (example 1).

To carry out the invention, use was made of:

a sorbitol syrup containing 70% dry matter commercially available under the trade name of NEOSORB® 70/02. 2% of gelatine in relation to the dry matter were added to this syrup. This syrup was used at 60° C., and a fine sorbitol powder of extreme purity, commercially available under the trade name of NEOSORB® P100.

To reproduce the processes disclosed in the above patents and patent application, use was made of:

only the extremely pure sorbitol syrup NEOSORB® 70/02, at a temperature of 40° C. in the case of the process described in patent EP 037 407.

the sorbitol powder NEOSORB® P100 during the forced coating stage, and NEOSORB® 70/02 syrup to prepare suspensions AI and AII used at 20° C. during the gumming, forced coating and hard coating stages, in accordance with the process described in patent application WO 91/09989, the sorbitol powder NEOSORB® P100 to prepare the powdered composition, and NEOSORB® 70/02 sorbitol syrup to formulate the two syrups described in U.S. Pat. No. 4,238,510; these syrups being maintained at 49° C. as indicated.

2. Conditions

To obtain the hard crunchy coating of the invention, one kilogramme of chewing gum cushions is placed in a revolving pan, at a speed of 20 rpm.

An initial quantity of 15 milliliters of sorbitol syrup is applied. Then after one or two minutes 30 grammes of sorbitol in powder form is added. The surface of the cushions is left to dry for one minute without carrying out drying by air flow.

This cycle is repeated five times, increasing the speeds of application and quantities added. During the last cycle, the quantity of syrup added is 35 milliliters, while that of powder is 50 grammes.

To finish, the cushions are left to rotate for some fifteen minutes. The total length of time spent during coating is 50 minutes, for a swelling of 30%.

As regards the processes of the prior art:

60 cycles must be carried out in accordance with the process described in patent EP 037 407, to obtain an equivalent swelling. The time required is about 6 hours.

17 cycles enable a similar swelling to be obtained when the process is carried out as indicated in patent application WO 91/09989. The result is obtained in about 2 hours.

10 cycles suffice to obtain an equivalent thickness of coating when following the indications of U.S. Pat. No. 4,238,510, but the time required is at least 24 hours, given the necessity to interrupt coating to dry the layers obtained before putting on the final coating.

3. Characteristics of the products obtained

The crunchiness and the hardness of the coatings of the two foregoing types of products were compared 1, 2 and 7 days after manufacture.

Oragnoleptic Data

The biting texture of the four types of coated chewing gum was judged by an expert panel of 7 people in a blind test.

The chewing gums coated in accordance with the U.S. Pat. No. 4,238,510 process were judged unacceptable since they were insufficiently crunchy both at 1 day and 7 days after manufacture.

At 1 day, the jury found a slight difference between the three other products, the most satisfactory of the three being that obtained in accordance with patent EP 037 407, followed by the product prepared following the indications of patent application WO 91/09989. The product in accordance with the invention seemed slightly less hard when bitten.

At 2 and 7 days, these three types of chewing gum were judged to be absolutely identical.

Instron Hardness Data

Hardness indices were measured at 1 day by means of a device which tested the coated chewing gum by piercing it with a plunger, the coated chewing gum being placed on a rigid plate. The crushing force was recorded as a function of the time needed to break the coating of the coated product.

The hardness data obtained corroborate the results described above since the hardness indices over five measurements were found to be an average of:

about 5 $mm^{-1}$ for products in accordance with U.S. Pat. No. 4,238,510, about 15 $mm^{-1}$ for products obtained in accordance with the invention as against 17 $mm^{-1}$ for products in accordance with EP 037 407 and 15.5 $mm^{-1}$ for products in accordance with patent application WO 91/09989.

In other words, the products of the invention are identical to those of the prior art after one day. They can be obtained in half the time required by the best of the techniques described by the prior art. No drying is necessary.

The process in accordance with the invention is therefore very time- and energy-saving in comparison with the techniques described in the prior art.

EXAMPLE II

Hard coating process in accordance with the invention using isomalt, maltitol and xylitol The process described in example 1 was repeated and used the same chewing gums but replaced the sorbitol powder and syrup by:

an isomalt powder commercially available under the trade name PALATINIT® and an isomalt syrup prepared from the latter and 1% of titanium oxide, with dry matter of 65%. The syrup was applied at a temperature of 60° C., a xylitol powder commercialized by the Applicant under the trade name XYLISORB® and a xylitol syrup prepared from the latter, with dry matter of 75%. The syrup was applied at a temperature of 60° C., and a maltitol powder commercialized by the Applicant under the trade name MALTISORB® and a maltitol syrup prepared from the latter, with dry matter of 65%. The syrup was also applied at a temperature of 60° C.

The coated products, obtained in under one hour in all three cases, with a swelling of around 25%, were stored for 2 days before being tested by the expert panel of Example 1.

As regards texture, the products based on isomalt and maltitol were judged very crunchy. The coated products made with xylitol had a sufficiently hard coating but were less crunchy.

As regards taste, the products coated with xylitol and maltitol were very much preferred.

Overall, the chewing gums coated with maltitol appeared to present the best organoleptic characteristics.

We claim:

1. A hard coating process enabling the creation of a hard coating on the surface of a product, comprising at least one coating cycle consisting essentially of applying a syrup comprising at least 90% by weight, based on its soluble dry matter, of a polyol selected from the group consisting of sorbitol, maltitol, mannitol, xylitol, erythritol, lactitol and isomalt; and then applying the same polyol in powder form, said polyol powder having a purity higher than 95% by weight, wherein said coating cycle is not followed by a forced drying.

2. A hard coating process according to claim 1, wherein the powder has a purity higher than 98%.

3. A hard coating process according to claim 2, wherein the powder has a purity higher than 99%.

4. A hard coating process according to claim 1, wherein the syrup is prepared from the polyol in powder form.

5. A hard coating process according to claim 1, wherein the syrup has a dry matter content of between 40 and 85%.

6. A hard coating process according to claim 1, wherein the syrup also contains 0.5 to 5% of gelatine, gum arabic or modified celluloses.

7. A hard coating process according to claim 6, wherein the syrup also contains 0.5 to 2% of pigments.

8. A hard coating process according to claim 1, wherein the powder has less than 10% of particles with a diameter over 250 microns and less than 10% of particles with a diameter under 40 microns.

9. A hard coating process according to claim 8, wherein the powder has an average diameter between 80 and 100 microns.

* * * * *